US006174609B1

(12) United States Patent
Katsumi et al.

(10) Patent No.: US 6,174,609 B1
(45) Date of Patent: Jan. 16, 2001

(54) RARE EARTH-BASED PERMANENT MAGNET OF HIGH CORROSION RESISTANCE

(75) Inventors: Kenichi Katsumi; Takehisa Minowa, both of Takefu (JP)

(73) Assignee: Shin-Etsu Chemical Co., Ltd., Tokyo (JP)

( * ) Notice: Under 35 U.S.C. 154(b), the term of this patent shall be extended for 0 days.

(21) Appl. No.: 09/209,481

(22) Filed: Dec. 11, 1998

(30) Foreign Application Priority Data

Dec. 19, 1997 (JP) .................................................. 9-350518

(51) Int. Cl.$^{7}$ ............................ B32B 15/08; H01F 1/053

(52) U.S. Cl. .......................... 428/450; 428/467; 428/469; 428/701; 428/702; 428/900; 428/928; 148/302

(58) Field of Search .................................... 428/467, 471, 428/469, 928, 900, 701, 702, 450; 148/302

(56) References Cited

U.S. PATENT DOCUMENTS 5,173,206 * 12/1992 Dickens et al. .
5,840,375 * 11/1998 Katsumi et al. .

FOREIGN PATENT DOCUMENTS 0248665A 12/1987 (EP) .

OTHER PUBLICATIONS

Patent Abstracts of Japan, vol. 097, No. 007, Jul. 13, 1997 JP09063833.

Patent Abstracts of Japan, vol. 097, No. 005, May 30, 1997, JP 09007868.

* cited by examiner

*Primary Examiner*—Timothy M. Speer
*Assistant Examiner*—Jennifer McNeil
(74) *Attorney, Agent, or Firm*—Dougherty & Troxell

(57) ABSTRACT

A rare earth-iron-boron permanent magnet such as neodymium—iron—boron permanent magnet can be imparted with high corrosion resistance by forming a corrosion-resistant coating layer on the surface comprising an alkali silicate, e.g., sodium silicate or lithium silicate, and a thermosetting resin such as melamine, epoxy and acrylic resins in uniform admixture.

7 Claims, No Drawings

RARE EARTH-BASED PERMANENT MAGNET OF HIGH CORROSION RESISTANCE

BACKGROUND OF THE INVENTION

The present invention relates to a rare earth-based permanent magnet of high corrosion resistance or, more particularly, to a rare earth-based permanent magnet mainly consisting of a rare earth element, iron and boron and imparted with high corrosion resistance by providing a highly corrosion-resistant coating layer on the surface thereof as well as to a method for the preparation of such a rare earth-based permanent magnet of high corrosion resistance.

By virtue of the excellent magnetic properties and high economical merits for the high performance, the application fields of rare earth-based permanent magnets are rapidly expanding year by year mainly in the field of electric and electronic instruments so that an important issue in this field is to further upgrade the rare earth-based permanent magnets.

Among various types of rare earth-based permanent magnets currently under practical applications, the permanent magnets formed from a ternary alloy of a rare earth element, iron and boron, referred to as a R—Fe—B alloy or magnet hereinafter, in which R is a rare earth element including yttrium and the elements having an atomic number of 57 to 71, constitute the major current because, besides the very superior magnetic properties, the rare earth element R in the R—Fe—B alloy can be neodymium which is, as compared with the earlier developed rare earth-cobalt magnet, in which the rare earth element is mainly samarium, by far more abundant as the natural resources than samarium and hence less expensive and the relatively expensive metal of cobalt need not be employed as an alloying element. Accordingly, the application fields of the R—Fe—B permanent magnets are expanding not only as a substitute for the rare earth-cobalt magnets used heretofore in compact-size instruments constructed by using very small permanent magnets but also in the field where the magnet constructing the magnetic circuit was a large-size inexpensive permanent magnet of low magnetic performance, such as hard ferrite magnets, or an electromagnet.

As a counterbalancing disadvantage to the above mentioned great advantages, the R—Fe—B magnets in general have a serious problem of low corrosion resistance, due to the reactivity of the rare earth element and iron as the principal ingredients, readily to be oxidized in the air, in particular, containing moisture resulting in a decrease in the magnetic performance of the magnet and possible contamination of the ambience by the oxidized matter eventually falling off the magnets.

Therefore, various proposals and attempts were made heretofore for the improvement of the corrosion resistance of the R—Fe—B magnets by the surface treatment including coating of the surface with a resin-containing coating composition, dry-process metallic plating by the method of, for example, ion plating, wet-process metallic plating to form a plating layer of nickel and so on. These surface treatment methods in the prior art are in general very complicated and time-consuming unavoidably leading to a remarkable increase in the overall manufacturing costs of the R—Fe—B magnets.

SUMMARY OF THE INVENTION

The present invention accordingly has an object to provide a R—Fe—B magnet having high corrosion resistance which can be prepared by a convenient and very efficient surface treatment method undertaken at a low cost.

Thus, the R—Fe—B magnet of high corrosion resistance provided by the present invention comprises:

(a) a sintered block of a magnetic alloy mainly consisting of a rare earth element, iron and boron; and (b) a coating layer on the surface of the sintered block of the magnetic alloy, the coating layer having a composition comprising, as a uniform blend, an alkali silicate and a thermosetting resin.

The above defined R—Fe—B magnet of high corrosion resistance is prepared by a method of the present invention which comprises the steps of:

(A) preparing an aqueous coating composition by admixing an aqueous solution of an alkali silicate with a water-soluble thermosetting resin or an aqueous emulsion of a thermosetting resin;

(B) coating the surface of a sintered block of a magnetic alloy mainly consisting of a rare earth element, iron and boron with the aqueous coating composition prepared in step (A) to form a coating layer;

(C) drying the coating layer; and (D) subjecting the dried coating layer to a heat treatment.

DETAILED DESCRIPTION OF THE PREFERRED EMBODIMENTS

The base body, on which the corrosion-resistant coating layer of a unique composition is formed according to the invention, is a sintered block of a magnetic alloy mainly consisting of a rare earth element, iron and boron, i.e. a R—Fe—B alloy, of which the rare earth element denoted by R constitutes from 5 to 40% by weight of the alloy. The rare earth element R is selected from yttrium and the elements having an atomic number of 57 to 71 but it is preferable that the rare earth element is yttrium or selected from the group consisting of lanthanum, cerium, praseodymium, neodymium, samarium, gadolinium, terbium, dysprosium, holmium, erbium, ytterbium and lutetium or, more preferably, the rare earth element R is selected from the group consisting of lanthanum, cerium, praseodymium, neodymium, terbium and dysprosium. It is optional that the constituent R in the R—Fe—B alloy is a combination of two kinds or more of these rare earth elements.

The weight fraction of boron in the R—Fe—B alloy is in the range from 0.2 to 6% by weight. The weight fraction of iron, which is basically the balance to the rare earth element and boron, can be up to 90% by weight. It is optional that a part of the iron in the R—Fe—B alloy is replaced with a minor amount of cobalt in the range, for example, from 0.1 to 15% by weight as the weight fraction of cobalt in the alloy as a whole with an object to improve the temperature characteristic of the magnetic properties. This improvement cannot be accomplished if the weight fraction of cobalt is less than 0.1% by weight while the R—Fe—B magnet would suffer a decrease in the coercive force if the weight fraction of cobalt exceeds 15% by weight. It is further optional that the R—Fe—B alloy is admixed with a limited amount of an adjuvant element selected from the group consisting of nickel, niobium, aluminum, titanium, zirconium, chromium, vanadium, manganese, molybdenum, silicon, tin, copper, calcium, magnesium, lead, antimony, gallium and zinc with an object to improve the magnetic properties of the R—Fe—B magnet or to reduce the costs of the alloy.

The method for the preparation of a sintered block of the magnetic alloy is well known in the art and is not particularly limitative.

In step (A) of the inventive method for the preparation of the corrosion-resistant R—FE—B magnet, an aqueous coating composition is prepared by admixing an aqueous solution of an alkali silicate with a resinous ingredient. The alkali silicate can be selected from sodium silicate or so-called water glass, potassium silicate and lithium silicate either singly or as a combination of two kinds or more, of which sodium silicate is preferred in respect of the inexpensiveness and lithium silicate is preferred when improvement is desired in the water resistance of the coating layer formed according to the inventive method. The concentration of the alkali silicate in the aqueous coating composition is preferably in the range from 3 to 200 g per liter calculated as $SiO_2$. When the concentration of the alkali silicate is too low, high corrosion resistance cannot be imparted to the permanent magnet block coated with the coating composition. When the concentration of the alkali silicate in the coating composition is too high, on the other hand, the aqueous solution of the alkali silicate has an unduly high viscosity and hence the coating composition with admixture of the alkali silicate solution with a resinous ingredient also has a high viscosity not to ensure good evenness of the coating layer on the permanent magnet block formed by coating with the coating composition followed by drying and a heat treatment.

The alkali silicate used in the form of an aqueous solution in the aqueous coating composition is expressed by the formula $M_2O.nSiO_2$, in which M is an alkali metal element and n, i.e. $SiO_2$:$M_2O$ molar ratio, is a positive number in the range from 1.5 to 20 or, preferably, in the range from 3.0 to 9.0. The value of n can be adjusted to a desired value by using a cation exchange resin according to a known method or by the addition of colloidal silica to an aqueous solution of an alkali silicate after adjustment of the concentration.

When the value of n is smaller than 1.5, the coating layer formed from the coating composition is too rich in the content of alkali so that the coating layer cannot be imparted with high water resistance in addition to the disadvantage that the excess of alkali reacts with carbon dioxide in the air to cause blooming of an alkali carbonate on the surface resulting in possible contamination of the instruments by the falling alkali carbonate bloom. Moreover, when the coated magnet is built in an instrument by using an adhesive, the adhesive bonding strength is greatly decreased on the coating layer containing an excess amount of alkali.

When the value of n in the alkali silicate is too large, on the other hand, the heat treatment of the coating layer produces an excessive shrinkage of the coating layer by the dehydration condensation between the silanolic hydroxyl groups as a consequence of the deficiency in the content of alkali so that highly corrosion-resistant coating layer can hardly be obtained. Moreover, an aqueous solution of an alkali silicate of which the value of n is too large has a trend to cause gelation due to the decreased solubility of the alkali silicate.

The aqueous coating composition used in the present invention is prepared by the admixture of an aqueous solution of an alkali silicate in a concentration mentioned above with a water-soluble resin or an aqueous emulsion of a resinous material which is either liquid or solid at room temperature. The mixing proportion of the alkali silicate and the resin is, each calculated as solid, such that the resultant coating layer consists of, preferably, from 3 to 10% by weight of the alkali silicate and the balance of the resin. A great improvement can be accomplished by the admixture of the resinous ingredient in the coating composition relative to the water resistance of the corrosion-resistant coating layer on the permanent magnet block so that the reliability of the corrosion-resistant treatment according to the invention can be increased. In addition, an improvement can be obtained in the stability of the adhesive bonding strength of the magnet surface in the lapse of time so that highly reliable adhesive bonding can be accomplished even to an acrylic adhesive or a cyanoacrylate adhesive having relatively high hygroscopicity not to give stable and reliable adhesive bonding when the corrosion-resistant coating layer on the permanent magnet is formed with a coating composition without admixture of the resinous ingredient. When the content of the alkali silicate is too low relative to the resin, the coating layer cannot exhibit full corrosion resistance while, when the content of the alkali silicate is too high, the adhesive bonding strength between the coating layer and the substrate surface would be decreased, though with sufficiently high corrosion resistance. If adequately formulated relative to the types of the alkali silicate and the resinous ingredient as well as the relative amounts of the respective ingredients, the corrosion-resistant coating layer is electrically insulating as an inherence of the resinous material. This feature is advantageous in the assemblage of various electric and electronic instruments because electric insulation can be obtained with other parts of the electric circuit without necessitating separate insulating means.

Examples of the resinous ingredient added to the aqueous solution of an alkali silicate include thermosetting melamine resins, epoxy resins and acrylic resins though not particularly limitative thereto. It is optional that two kinds or more of these resins are used in combination, if compatible. When the resinous ingredient is soluble in water, the resin as such can be dissolved in the aqueous solution of the alkali silicate. When the resin, which can be either liquid or solid, is insoluble in water, the aqueous solution of the alkali silicate is admixed with an aqueous emulsion of such a water-insoluble resin prepared separately. It is further optional according to need that the aqueous coating composition is admixed with a curing agent or catalyst for the resinous ingredient.

The amount of the above described resinous ingredient in the liquid coating composition is, calculated as the resin per se, in the range from 20 to 1500 g/liter. When the amount of the resinous ingredient is too small, the desired improvement in the water resistance of the corrosion-resistant coating layer can hardly be obtained as a matter of course. When the amount of the resinous ingredient is too large, on the other hand, the aqueous coating composition has an unduly high viscosity not to ensure good uniformity in the thickness of the corrosion-resistant coating layer formed on the surface of the permanent magnet block.

The coating method for forming a coating layer of the above described aqueous coating composition on the surface of the permanent magnet block is not particularly limitative including dip coating, brush coating, spray coating and any other known methods convenient for the purpose. The wet coating layer on the magnet surface is then dried, preferably, by heating and further subjected to a heat treatment to effect dehydration condensation between the silanolic hydroxyl groups of the alkali silicate and condensation reaction of the thermosetting resinous ingredient in the coating layer so as to increase the water resistance of the coating layer.

The above mentioned heat treatment is conducted at a temperature in the range from 50 to 450° C. or, preferably, from 120 to 300° C. for a length of time in the range from 5 to 120 minutes in order to ensure completeness of the condensation reactions. When the heat treatment temperature is too low or the time for the heat treatment is too short, desired high corrosion resistance or, in particular, water resistance of the coating layer cannot be obtained due to incomplete condensation reactions. When the heat treatment temperature is too high, certain adverse influences are resulted in the structure of the R—Fe—B magnet to decrease the magnetic properties of the permanent magnet. The upper limit of the heat treatment time is given solely in consideration of the productivity and hence the costs of the coating process since no particular adverse influences are caused on the properties of the permanent magnet product obtained by the heat treatment for an excessively long time of the heat treatment.

The thickness of the corrosion-resistant coating layer on the magnet surface should be in the range from 5 nm to 10 $\mu$m. If the desired thickness of the coating layer cannot be obtained by a single coating procedure, the above mentioned steps of coating, drying and heat treatment can be repeated twice or more to increase the thickness. No good corrosion resistance can be obtained when the thickness of the coating layer is too small as a matter of course while a problem in the appearance of the coated permanent magnet is caused due to the difficulty in obtaining a coating layer of a uniform thickness when the thickness is too large though without any problems in the performance of the coated magnet including the corrosion resistance. Even if good uniformity can be obtained in the coating layer, a permanent magnet product having a coating layer of a too large thickness is practically undesirable because of a decrease in the effective volume of the magnet per se relative to the overall volume thereof including the volume of the coating layer.

It is desirable that the coating treatment of the R—Fe—B magnet block with the aqueous coating composition is preceded by an ultrasonic cleaning treatment because the surface of a permanent magnet block usually has a deposit of machining debris or fine magnetic dust particles adhering thereto by physical adsorption or magnetic attraction and these particulate foreign matters result in occurrence of defects in the coating layer and decrease in the adhesive bonding of the coating layer to the magnet surface consequently with a decrease in the corrosion resistance of the magnet product.

In the prior art for imparting a rare earth-based permanent magnet with increased corrosion resistance, for example, by a wet-process plating method to form a plating layer of nickel and the like or by a chemical conversion treatment such as the zinc phosphate treatment, these surface treatments must be preceded by complicated pretreatments including degreasing to completely remove any greasy contaminants from the magnet surface, acid pickling treatment to remove a layer of the rare earth oxide which disturbs formation of good adhesion with the corrosion-resistant coating layer and activation treatment to ensure reliable formation of the coating layer. Without undertaking these complicated and expensive pretreatments, no reliable adhesive bonding can be obtained between the magnet surface and the corrosion-resistant coating layer.

In the method for the formation of a corrosion-resistant coating layer on the magnet surface according to the present invention, in contrast to the prior art method, the above described complicated pretreatment procedures can be omitted and the ultrasonic cleaning treatment alone can give a quite satisfactory result with a great saving in the costs. This is because, different from the wet-process plating and chemical conversion treatment in the prior art method involving the interaction between the magnet surface and the treatment liquid to form the corrosion-resistant coating layer, the corrosion-resistant coating layer in the present invention is formed by merely drying the wet coating layer and subjecting the dried coating layer to a heat treatment to effect the condensation reactions within the coating layer per se.

In the following, the present invention is illustrated in more detail by way of Examples and Comparative Examples, which, however, never limit the scope of the invention in any way.

Example 1 and Comparative Examples 1 to 3.

A rare earth-based magnetic alloy ingot was prepared by melting 32.0% by weight of neodymium, 1.2% by weight of boron, 59.8% by weight of iron and 7.0% by weight of cobalt in a high-frequency induction furnace under an atmosphere of argon followed by casting of the melt. The ingot obtained by cooling of the melt was crushed in a jaw crusher into coarse particles which were finely pulverized in a jet mill with nitrogen as the jet gas into fine alloy particles having an average particle diameter of 3.5 $\mu$m. A metal mold was filled with this fine alloy powder which was compression-molded into a powder compact under a compressive pressure of 1.0 ton/cm$^2$ with application of a magnetic field of 10 kOe in the direction of compression.

The thus prepared green body was subjected to a sintering treatment by heating in vacuum at 1100° C. for 2 hours and then to an aging treatment in vacuum at 550° C. for 1 hour to complete a permanent magnet block, from which pieces of the magnet in the form of a pellet having a diameter of 20 mm and a height of 5 mm were taken by machining followed by barrel polishing and an ultrasonic cleaning treatment to finish base magnet pieces for coating.

Separately, an aqueous coating composition was prepared by admixing an aqueous solution of water glass having an Si:Na molar ratio adjusted to 5.5 with a water-soluble melamine resin. The concentration of sodium silicate was 30 g/liter calculated as $SiO_2$ and the concentration of the melamine resin was 400 g/liter in the thus prepared coating composition. The base magnet piece for Example 1 was coated with this coating composition by dipping therein and then subjected to a heat treatment at 200° C. for 20 minutes in a hot air circulation oven to complete a corrosion-resistant R—Fe—B magnet specimen provided with a water-insoluble coating layer having a thickness of 1 $\mu$m.

In Comparative Examples 1 and 2, the coating treatment of the base magnet pieces was conducted in substantially the same manner as in Example 1 except that the water-soluble melamine resin was omitted in Comparative Example 1 and the water glass was omitted in Comparative Example 2 in the formulation of the respective aqueous coating compositions. Comparative Example 3 was undertaken for the purpose of control by subjecting the uncoated base magnet piece as such to the evaluation test described below.

The above prepared coated or uncoated test specimens were kept for 300 hours in an atmosphere of 90% relative humidity at a temperature of 80° C. and subjected to the measurement of the surface area covered with rust to find that, while absolutely no rust-covered areas were detected in Example 1, 12%, 24% and 68% of the surface areas were covered with rust in Comparative Examples 1, 2 and 3, respectively, to indicate outstandingly high corrosion resistance of the R—Fe—B magnet according to the present invention.

Example 2 and Comparative Examples 4 and 5.

An aqueous coating composition was prepared by admixing an aqueous solution of lithium silicate having an Si:Li molar ratio adjusted to 4.5 with an aqueous emulsion of an epoxy resin and a water-dispersible polyamideamine as a curing agent therefor in such amounts that the concentration of the lithium silicate was 45 g/liter calculated as $SiO_2$, the concentration of the epoxy resin was 500 g/liter and the concentration of the curing agent was 60 g/liter in the coating composition.

In Example 2, the base magnet pieces prepared in the same manner as in Example 1 were coated, after an ultrasonic cleaning treatment in water, with the above prepared coating composition by dipping therein and subjected to a heat treatment at 180° C. for 30 minutes in a hot air circulation oven to complete corrosion-resistant coated R—Fe—B magnet pieces.

For comparison in Comparative Example 4, the same coating treatment as above was undertaken excepting for the omission of the epoxy resin emulsion and the curing agent therefor in the formulation of the coating composition. For further comparison in Comparative Example 5, the base magnet pieces were provided with a plating layer of nickel by the electrolytic plating method instead of forming a coating layer as in Example 2.

Each of the thus coated or nickel-plated magnetic test pieces was adhesively bonded on the flat surface thereof to a test panel of iron by using an acrylic adhesive and the shearing adhesive bonding strength was measured before and after an accelerated aging treatment by keeping for 300 hours in an atmosphere of 90% relative humidity at 80° C. to calculate the % drop in the adhesive bonding strength. The results were that the % drop in the adhesive bonding strength was 18%, 53% and 21% in Example 2, Comparative Example 4 and Comparative Example 5, respectively, indicating superiority of the combined use of lithium silicate and an epoxy resin.

What is claimed is:

1. A rare earth-based permanent magnet of high corrosion resistance which comprises:

a) a sintered block of a magnetic alloy mainly consisting of a rare earth element, iron and boron; and b) a coating layer formed on the surface of the sintered block of the magnetic alloy, the coating layer having a composition comprising, as a uniform blend, an alkali silicate and a thermosetting resin; and in which the coating layer consists of from 3 to 10% by weight of the alkali silicate and the balance of the thermosetting resin.

2. The rare earth-based permanent magnet of high corrosion resistance as claimed in claim 1 in which the alkali silicate is sodium silicate.

3. The rare earth-based permanent magnet of high corrosion resistance as claimed in claim 1 in which the alkali silicate is lithium silicate.

4. The rare earth-based permanent magnet of high corrosion resistance as claimed in claim 1 in which the thermosetting resin is selected from the group consisting of melamine resins, epoxy resins and acrylic resins.

5. The rare earth-based permanent magnet of high corrosion resistance as claimed in claim 1 in which the coating layer has a thickness in the range from 5 nm to 10 $\mu$m.

6. The rare earth-based permanent magnet of high corrosion resistance as claimed in claim 1 in which the alkali silicate is expressed by the formula $M_2O.nSiO_2$, in which M is an alkali metal element and n is a positive number in the range from 1.5 to 20.

7. The rare earth-based permanent magnet of high corrosion resistance as claimed in claim 6 which the alkali silicate is expressed by the formula $M_2O.nSiO_2$, in which M is an alkali metal element and n is a positive number in the range from 3.0 to 9.0.

* * * * *